(12) United States Patent
Lockin et al.

(10) Patent No.: US 9,828,083 B2
(45) Date of Patent: Nov. 28, 2017

(54) METHODS AND COMPONENTS FOR WING-TO-FUSELAGE INTEGRATION

(71) Applicant: The Boeing Company, Chicago, IL (US)

(72) Inventors: Charles B. Lockin, Bothell, WA (US); Marcus A. Erickson, Snohomish, WA (US); Oladele A. Adedeji, Lynnwood, WA (US); Kevin R. Puzey, Lake Stevens, WA (US)

(73) Assignee: The Boeing Company, Chicago, IL (US)

( * ) Notice: Subject to any disclaimer, the term of this patent is extended or adjusted under 35 U.S.C. 154(b) by 293 days.

(21) Appl. No.: 14/541,379

(22) Filed: Nov. 14, 2014

(65) Prior Publication Data

US 2016/0137283 A1    May 19, 2016

(51) Int. Cl.
*B64C 1/26*          (2006.01)
*B64F 5/10*          (2017.01)

(52) U.S. Cl.
CPC ............... *B64C 1/26* (2013.01); *B64F 5/10* (2017.01); *Y10T 29/49622* (2015.01)

(58) Field of Classification Search
CPC .. B64C 1/26; B64C 3/182; B64C 3/26; B64C 1/06; B64F 5/0009; B64F 5/10; Y10T 29/49622; Y10T 29/49947–29/49964
See application file for complete search history.

(56) References Cited

U.S. PATENT DOCUMENTS

| | | | |
|---|---|---|---|
| 8,016,236 B2 | 9/2011 | Grieve et al. | |
| 8,272,118 B2* | 9/2012 | Alvez | B21J 15/14 29/464 |
| 8,777,158 B2 | 7/2014 | Erickson | |
| 2002/0050043 A1* | 5/2002 | Sarh | B21J 15/10 29/407.01 |
| 2003/0167826 A1* | 9/2003 | Holt | G01M 3/26 73/40 |
| 2009/0069920 A1* | 3/2009 | Franzen | G06Q 10/06 700/97 |
| 2009/0146007 A1* | 6/2009 | Keeler, Jr. | B64C 1/26 244/119 |
| 2014/0103162 A1 | 4/2014 | Thomas et al. | |
| 2015/0090007 A1* | 4/2015 | Redman | B64F 5/009 73/40.7 |

* cited by examiner

*Primary Examiner* — Sarang Afzali
(74) *Attorney, Agent, or Firm* — McDonnell Boehnen Hulbert & Berghoff LLP

(57) ABSTRACT

A method for wing-to-fuselage integration is disclosed. The method includes attaching a fitting to a wing box assembly of an aircraft at an early stage of integration and then attaching the fitting to a stub beam attached to a fuselage panel of the aircraft at a later stage of integration. The fitting eliminates the need to attach the stub beam directly to the wing box assembly.

11 Claims, 5 Drawing Sheets

METHODS AND COMPONENTS FOR WING-TO-FUSELAGE INTEGRATION

FIELD

The disclosure is related to aircraft manufacturing and, more particularly, a method and apparatus for wing-to-fuselage integration.

BACKGROUND

During manufacturing, large sections of an aircraft are pre-fabricated and then integrated together to create a complete vehicle. For example, a fuselage panel is attached to a wing box assembly during aircraft manufacturing. The fuselage panel is a section of the aircraft's main body. The wing box assembly is the main load carrying component of an aircraft wing.

Normal fuselage-to-wing box attachments fulfill several requirements including providing a pressure boundary and ensuring compatible deflections between the assemblies in all directions. To attach the fuselage panel to the wing box assembly, a series of stub beams are often connected between these two aircraft sections. This operation is time consuming because the fasteners used to attach the stub beams to the wing box assembly are numerous and difficult to drill.

Another problem arises when there are titanium or other hard metal elements in the attaching joint. A drill is used to create fastener holes through the stub beams and the wing box assembly. These fastener holes traditionally penetrate the wing box assembly. When there are hard metal elements in the joint, a specialized drill is required to drill the harder metal and possibly to mitigate burrs generated during drilling. Unfortunately, the large size of the specialized drill needed with hard metals interferes with the stub beam and the surrounding structures making it nearly impossible to attach the fuselage panel to the wing box assembly. Traditionally, these complex operations are performed in the later stages of the aircraft manufacturing.

It is common that a portion of the wing box assembly is also a fuel containing vessel. In the case that the fasteners penetrate this wing box assembly fuel boundary, many additional steps are required to clean the drilling contaminants from the fuel cell, seal the fuel boundary, and test the sealing.

Thus, a need exists to attach the fuselage panel to the wing box assembly in a manner that simplifies the manufacturing process.

SUMMARY

Methods for wing-to-fuselage integration are disclosed. In one example, the method includes attaching a fitting to a wing box assembly, attaching a stub beam to a fuselage panel, placing the stub beam adjacent to the fitting, and attaching the stub beam to the fitting. In another example, the method includes attaching the fitting to the wing box assembly, placing the fuselage panel adjacent to the wing box assembly, attaching the stub beam to the fuselage panel, and attaching the stub beam to the fitting. In another example, the method includes attaching a first wall of the fitting to the wing box assembly in an early stage of aircraft manufacturing, and attaching a second wall of the fitting to the stub beam attached to the fuselage panel during a later stage of aircraft manufacturing. Beneficially, the stub beams are not directly attached to the wing box assembly in these methods.

The features, functions, and advantages that have been discussed can be achieved independently in various embodiments or may be combined in yet other embodiments further details of which can be seen with reference to the following description and drawings.

BRIEF DESCRIPTION OF THE DRAWINGS

Presently preferred embodiments are described below in conjunction with the appended drawing figures, wherein like reference numerals refer to like elements in the various figures, and wherein.

Figure 1:
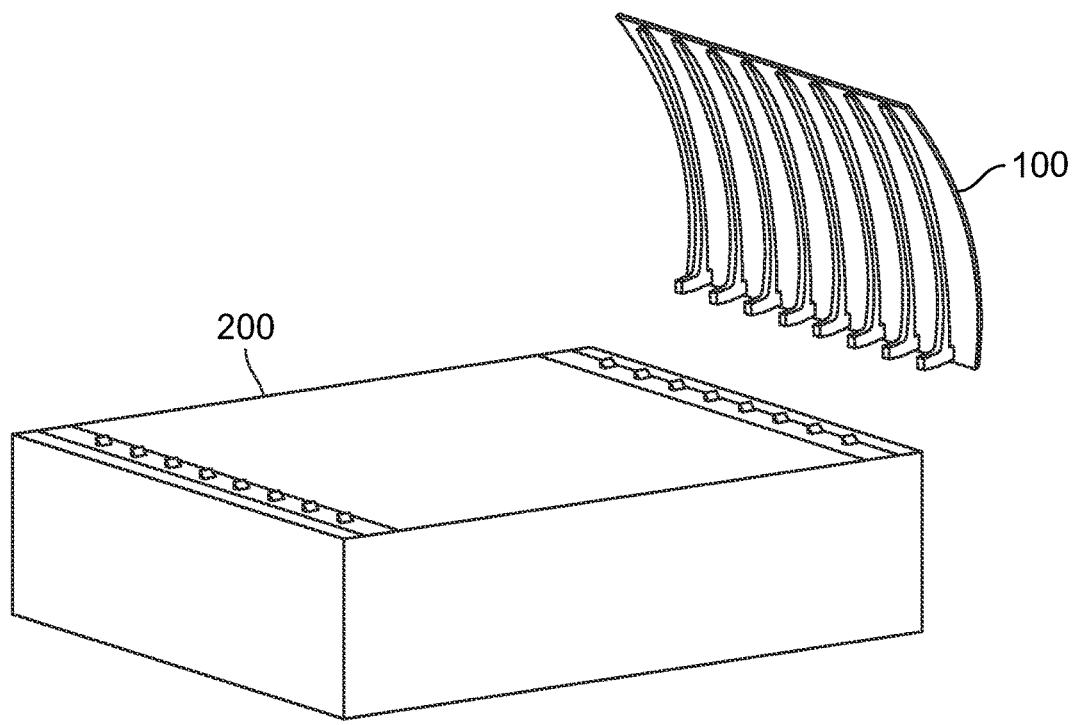
FIG. 1 is an illustration of a fuselage panel prior to integration with a wing box assembly, according to an example.

The drawings are for the purpose of illustrating example embodiments, but it is understood that the inventions are not limited to the arrangements and instrumentality shown in the drawings.

DETAILED DESCRIPTION

The following description describes an aircraft manufacturing process. In particular, the description describes the wing-to-fuselage integration process. The wing-to-fuselage integration process joins two large prefabricated pieces of an aircraft, specifically, a fuselage panel to a wing box assembly. The wing-to-fuselage integration process occurs twice, once for the left-hand side and once for the right-hand side of the aircraft.

The wing box assembly is the main load carrying component of an aircraft wing. The wing box assembly typically extends through the fuselage section of the aircraft. A portion of the wing box assembly may also be a fuel containing vessel. The fuselage panel involved in the wing-to-fuselage integration process is the body panel that is attached to the wing box assembly.

It is understood that the benefits described herein apply to any aircraft that requires wing-to-fuselage integration. As such, the terms "fuselage panel," "wing box assembly," and "stub beam" are generic terms that are not limited to any particular aircraft type.

FIG. 1 is an illustration of a fuselage panel 100 prior to integration with a wing box assembly 200. The left-hand side fuselage panel 100 is shown in FIG. 1. A similar right-hand side fuselage panel is not shown in FIG. 1. While the wing-to-fuselage integration is shown in FIGS. 1-4 with respect to the left-hand side of the aircraft, it is understood that a similar integration process on the right-hand side of the aircraft occurs during aircraft manufacturing.

Figure 2:
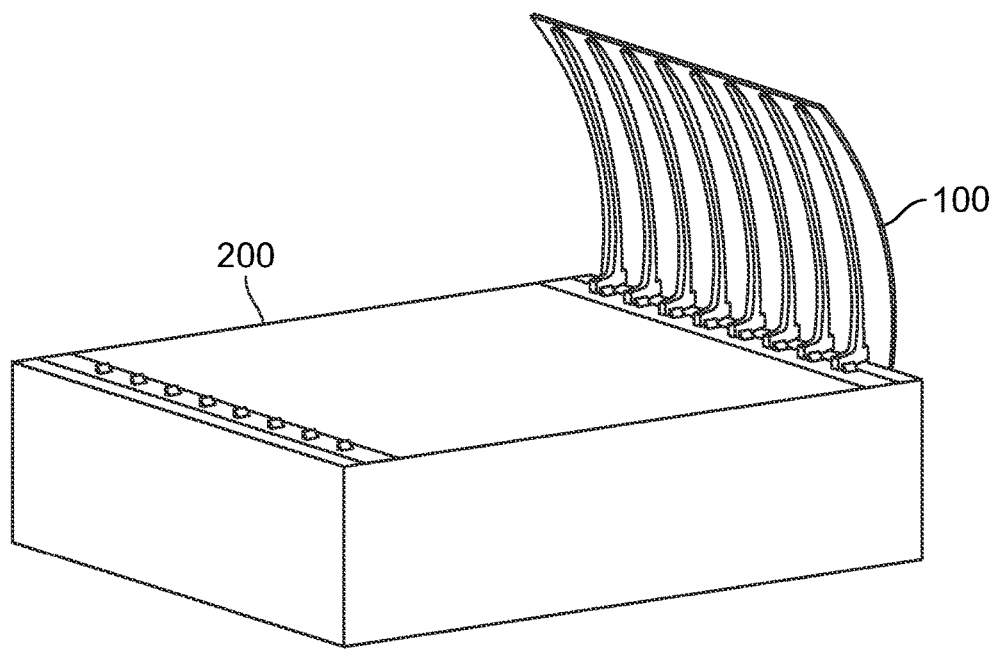
FIG. 2 is an illustration of the fuselage panel positioned for attachment to the wing box assembly, according to an example.

FIG. 2 is an illustration of the fuselage panel 100 positioned for attachment to the wing box assembly 200. Typically, a jack holds the wing box assembly 200 in place. Then, a crane picks up and lowers the fuselage panel 100 into place. The crane has the ability to precisely position the fuselage panel 100 with respect to the wing box assembly 200.

Figure 3:
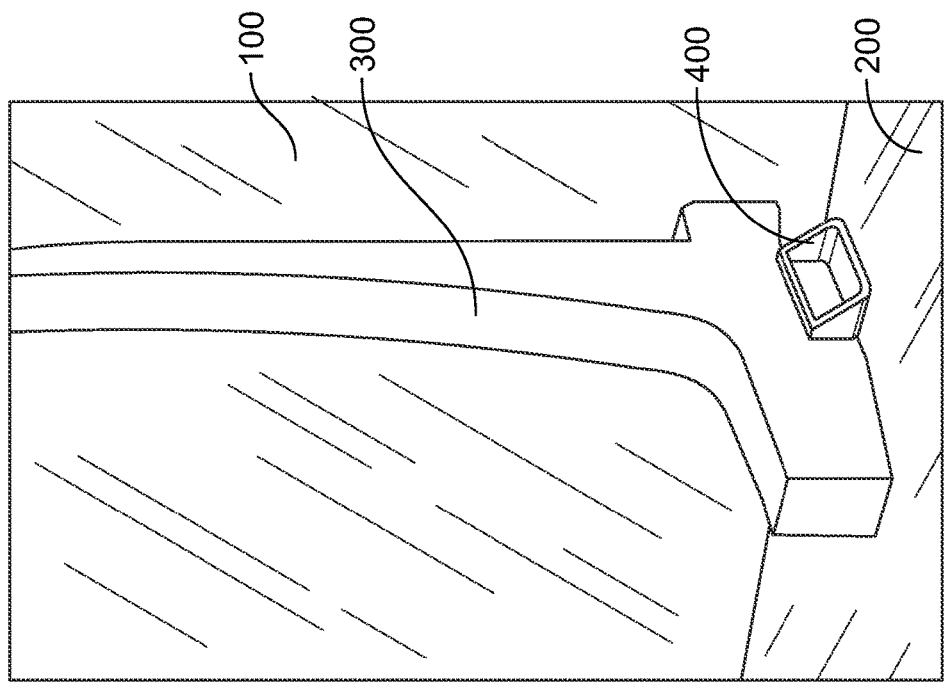
FIG. 3 is an illustration of a stub beam and fitting for attaching the fuselage panel to the wing box assembly, according to an example.

FIG. 3 is an illustration of a stub beam 300 and a fitting 400 for connecting the fuselage panel 100 to the wing box assembly 200. As described further, the stub beam 300 is attached to the fuselage panel 100, and the fitting 400 is attached to the wing box assembly 200 and then later to the stub beam 300. While only one stub beam 300 and one fitting 400 are shown in FIG. 3, there are more than one stub beam 300 and fitting 400 connections that occur during wing-to-fuselage integration. The number of connections depends on the position and number of stub beams over the wing.

The stub beam 300 is sometimes referred to as a side frame as it provides structural support for the fuselage panel 100. Specifically, the stub beam 300 is designed to withstand the forced deflection and flight loads from the aircraft's wings and pressure load from the fuselage.

The fitting 400 is an angle corner fitting. The fitting 400 includes two surfaces that form a primary angle and two surfaces that form reinforcing walls or gussets. Stated another way, the fitting 400 is shaped as a three-dimensional triangle with a missing bottom. One planar side is attached to the wing box assembly 200 and the other planar side is attached to the stub beam 300.

The fitting 400 is designed to maximize the amount of the fitting 400 that is visible after installation so that the fitting 400 can be visually inspected for fractures or other failures. Other fitting designs with at least two planar sides are possible, such as T-shaped or L-shaped fittings. The fitting 400 may be integral to another wing component and there may be multiple fitting features integral to another wing component.

The fitting 400 is preferably formed using aluminum when the stub beam 300 is formed using aluminum because aluminum is easy to drill and the like materials are not prone to galvanic corrosion interactions. The fitting 400 may be formed using other materials. For example, the fitting 400 may be formed using titanium, which may be preferable if the airframe is manufactured using titanium or carbon fiber reinforced polymer (CFRP). In the case that the wing box assembly interface with the fitting 400 is not aluminum, the fitting material is best chosen to be the anodic element in any galvanic interaction as the fitting 400 is more easily repaired than the wing box assembly 200 or the stub beam 300.

The fitting 400 may include four holes, two holes on each of the two surfaces that form the primary angle. The first two holes are pilot holes for drilling fastener holes through the planar surface of the fitting 400 and into the wing box assembly 200. The other two holes are pilot holes for drilling fastener holes through the upright surface of the fitting 400 and into the stub beam 300. The fitting 400 may have more or less than four pilot holes, including no holes at all. The holes merely facilitate drilling.

Figure 4:
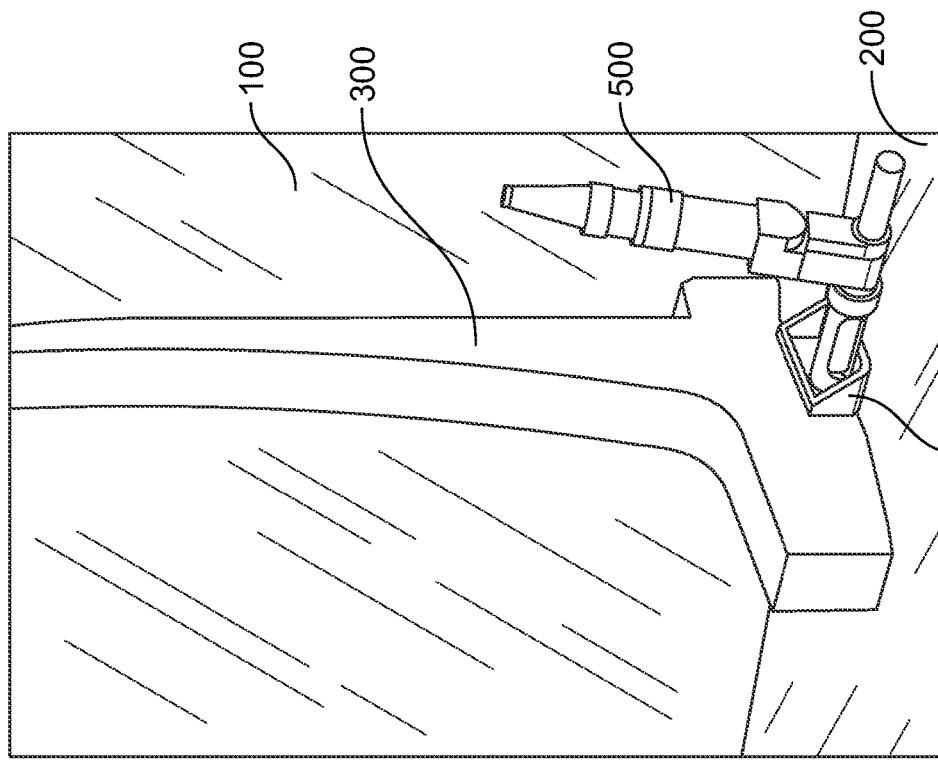
FIG. 4 is an illustration of a drill creating fastener holes for fitting-to-stub beam fasteners, according to an example.

FIG. 4 is an illustration of a drill 500 creating holes for fasteners connecting the fitting 400 to the stub beam 300. Because the stub beam 300 is attached to the fitting 400 and not to the wing box assembly 200, drilling access is easier and the wing box assembly 200 is not penetrated. This allows the wing box assembly 200 to be sealed and leak tested prior to integration with the fuselage and, as a result, the manufacturing process is simplified. As depicted in FIG. 4, the drill has clear access to the attachment location. Additionally, because aluminum-to-aluminum drilling is easier than drilling into titanium, a specialized titanium drilling apparatus is unnecessary.

Figure 5:
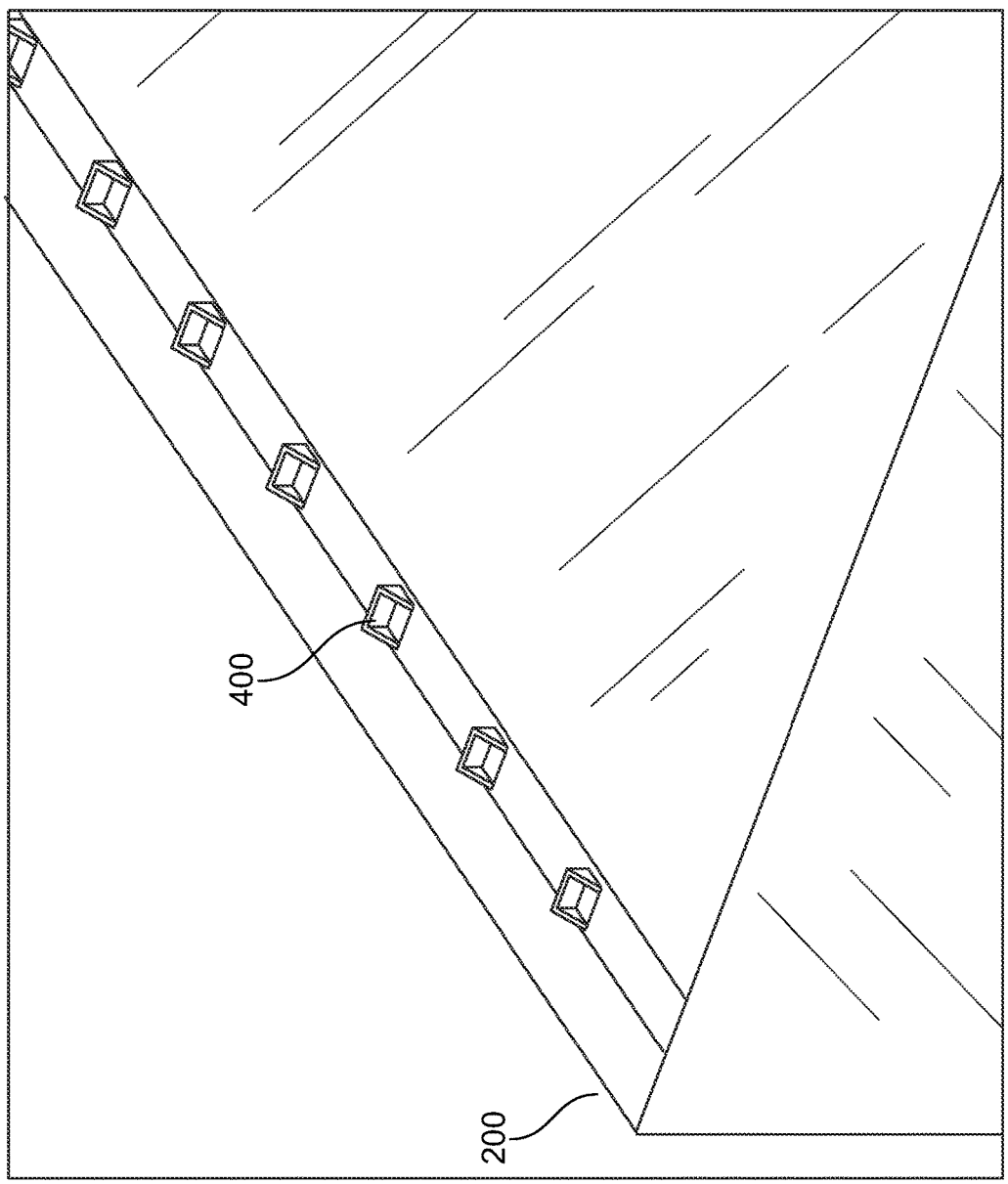
FIG. 5 is an illustration of multiple fittings attached to the wing box assembly, according to an example.

FIG. 5 is an illustration of multiple fittings 400 connected to the wing box assembly 200. The number of fittings 400 attached to the wing box assembly 200 is based on the number of stub beams 300 connecting to the wing box assembly 200. In this example, the size of the fittings 400 can be optimized for varying loads occurring from a leading edge end of the wing box assembly 200 to a trailing edge end of the wing box assembly 200. The size of the fittings 400 depends on load transfer and forced deflections between wing and fuselage. Multiple fittings could be integral to a single wing component in lieu of individual fittings. Each aircraft design has different wing/fuselage loads, which are used to design the fittings 400.

Figure 6:
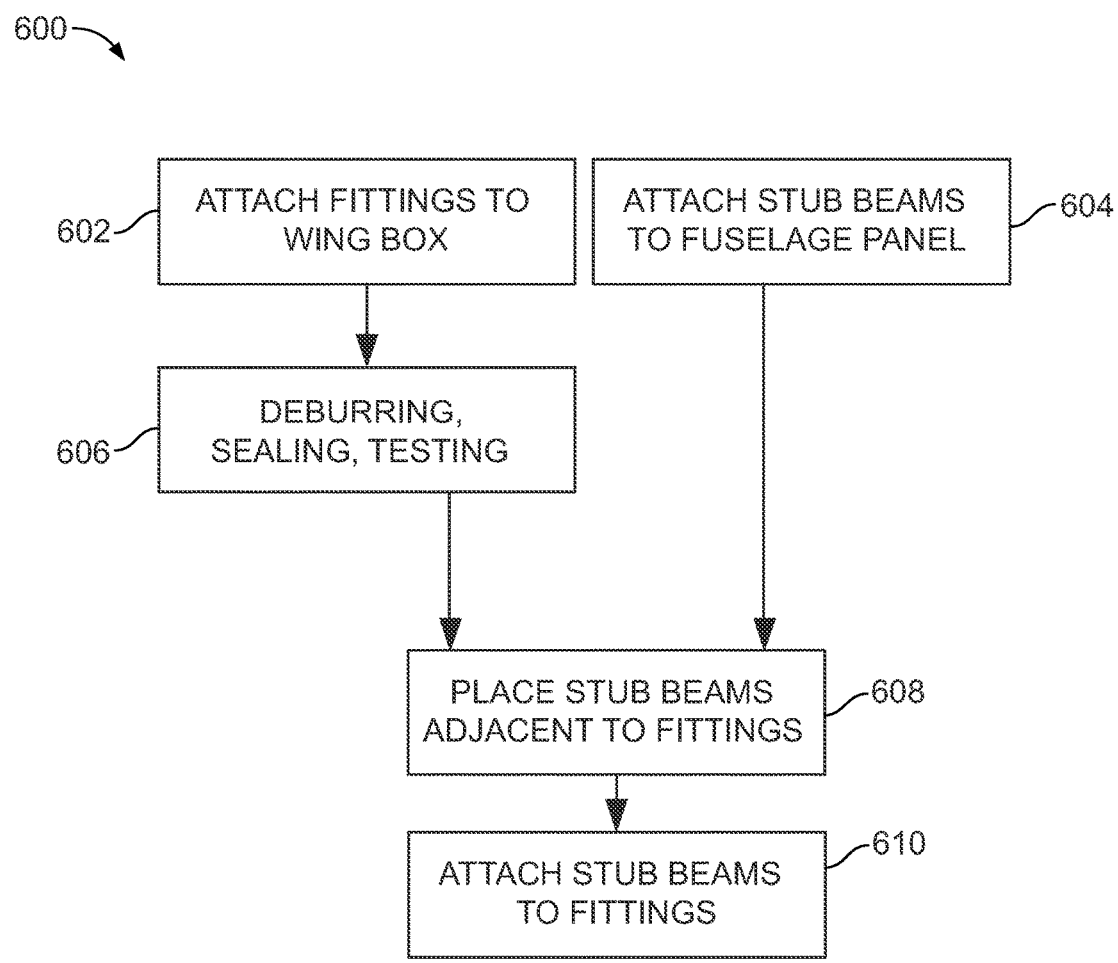
FIG. 6 is an illustration of a flow chart for a method of wing-to-fuselage integration, according to an example.

FIG. 6 is a flow chart of a method 600 for wing-to-fuselage integration. At block 602, the fittings 400 are attached to the wing box assembly 200. The fittings 400 may be attached by drilling holes and installing one or more fasteners through the planar surface of the fitting 400 and into the wing box assembly 200. While two threaded nut bolts are preferable for attaching the fittings 400 to the wing box assembly 200, other fastening mechanisms may be used.

At block 606, the wing box assembly 200 is deburred, sealed, and the seals are tested. By drilling into the wing box assembly 200 at this early stage in the manufacturing, burrs may be eliminated by taking apart the structure and performing conventional deburring. Burrs may also be mitigated by using a larger, specialized drill to drill through an aluminum-titanium/CFRP stack. Also at block 606, sealing and testing of the wing box assembly 200 may be performed at an early stage in the manufacturing prior to integration with the fuselage.

At block 604, the stub beams 300 are attached to the fuselage panel 100. The stub beams 300 may be attached by drilling and installing multiple fasteners through fuselage panel 100 and into the stub beams 300. Other fastening mechanisms may be used as appropriate for airframe manufacturing.

Block 602 and block 604 are shown next to each other to indicate that these two manufacturing steps could take place at two different locations. For example, a first vendor may supply the wing box assembly 200 with the fittings 400 attached and a second vendor may supply the fuselage panel 100 with the stub beams 300 attached. As another example, only one of these airframe sections is outsourced and the other airframe section is manufactured in-house. While these two manufacturing steps 602 and 604 can take place at substantially the same time, it is also possible for one airframe section to be manufactured before the other.

At block 608, the stub beams 300 are placed adjacent to the fittings 400. In a typical airframe manufacturing process, a jack holds the wing box assembly 200 in place, while a crane picks up and lowers the fuselage panel 100 in a precise manner as to place the stub beams 300 adjacent to the fittings 400. The fittings 400 may be used as a guide in positioning the fuselage panel 100 in relation to the wing box assembly 200. Shims may be placed between the stub beams 300 and the fittings 400 as necessary to allow for manufacturing differences.

At block 610, the stub beams 300 are attached to the fittings 400. The fittings 400 may be attached by drilling holes and installing one or more fasteners in the upright surface of the fitting 400 and into the stub beam 300. While two threaded nut bolts are preferable for attaching the fitting 400 to the stub beam 300, other fastening mechanisms may be used.

In the method 600, the stub beams 300 are attached to the fuselage panel 100 prior to placing the stub beams 300 adjacent to the fittings 400. Alternatively, the fuselage panel 100 may be placed in position with respect to the wing box assembly 200 prior to attaching the stub beams 300 to the fuselage panel 100. In this scenario, the shims placed between the stub beams 300 and fittings 400 may be reduced in thickness or eliminated. This example is shown in FIG. 7.

Figure 7:
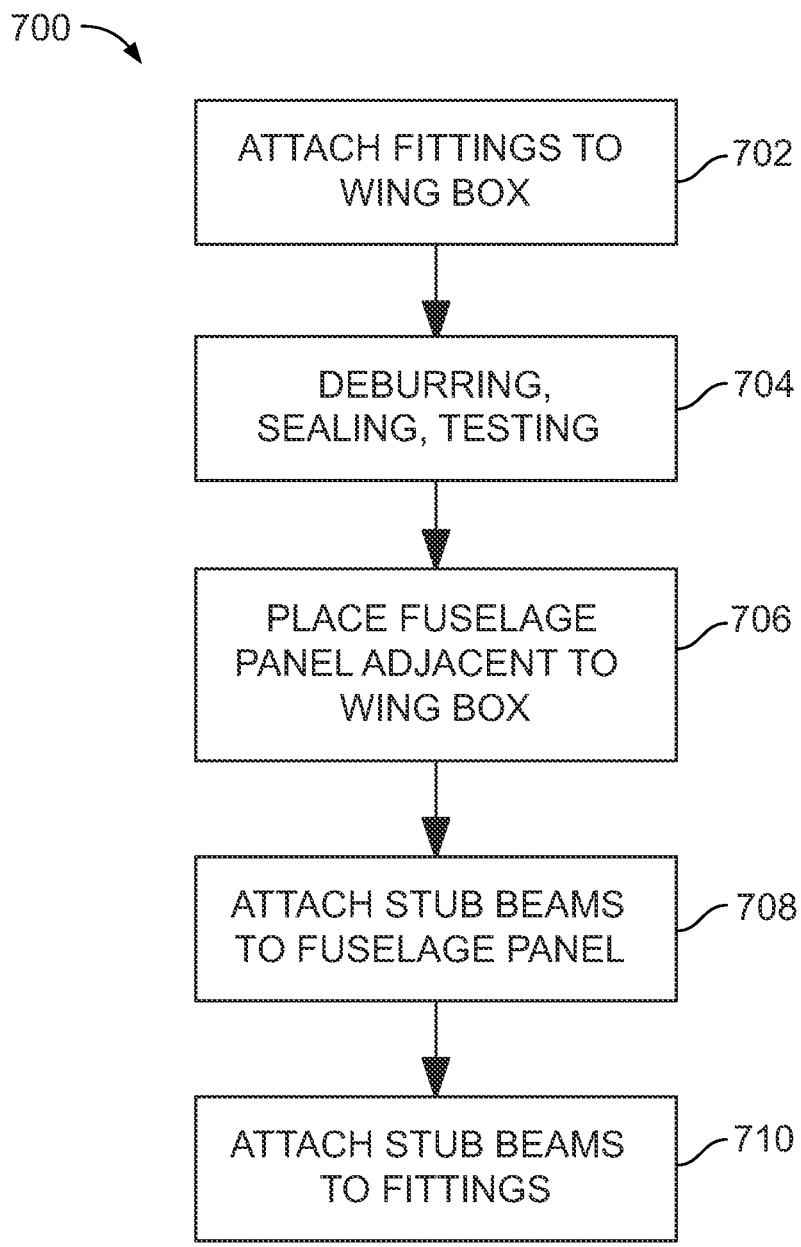
FIG. 7 is an illustration of a flow chart for a method of wing-to-fuselage integration, according to another example.

FIG. 7 is a flow chart of a method 700 for wing-to-fuselage integration. At block 702, the fittings 400 are attached to the wing box assembly 200 in a similar manner as described with respect to block 602. At block 704, cleaning drilling contaminants from the fuel cell, sealing the fuel boundary of the wing box assembly 200, and testing the seal occur in a similar manner as described with respect to block 606. As a result, the method 700 provides the same advantages as the method 600 of moving the drilling, sealing, and leak testing of the wing box assembly 200 to earlier in the manufacturing process.

At block 706, the fuselage panel 100 is placed adjacent to the wing box assembly 200. A jack holds the wing box assembly 200 in place, while a crane picks up and lowers the fuselage panel 100 in a precise manner as to place the fuselage panel 100 adjacent to the wing box assembly 200. With the fittings 400 already attached to the wing box assembly 200, the fittings 400 may be used as a guide in positioning the fuselage panel 100 in relation to the wing box assembly 200.

At block 708, the stub beams 300 are attached to the fuselage panel 100. The stub beams 300 are attached to the fuselage panel 100 is a similar manner as described with respect to block 604. The difference here is that the assembly tolerances between the fittings 400 and the stub beams 300 may be managed differently, which in turn may reduce the thickness of or eliminate the need for shims at block 710.

At block 710, the stub beams 300 are attached to the fittings 400 in a similar manner as described with respect to block 610.

Using the fitting 400 in wing-to-fuselage integration changes the order of the typical aircraft manufacturing process. In particular, drilling into the wing box assembly 200 has been moved to earlier in the process, which has several benefits including performing sealing and leak testing earlier in the manufacturing process and allowing the wing box attachment holes to be deburred, which improves fatigue life. Additionally, attaching the stub beams 300 to the fittings 400 is a much simpler process than attaching the stub beams 300 directly to the wing box assembly 200. As a result, a smaller drill motor may be used and the time required to perform this later step of manufacturing is reduced. Beneficially, the fitting 400 reduces the time and costs of aircraft manufacturing.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

We claim:

1. A method for wing-to-fuselage integration, comprising:
   attaching a fitting to a wing box assembly;
   placing a fuselage panel adjacent to the wing box assembly;
   after placing the fuselage panel adjacent to the wing box assembly, attaching a stub beam to the fuselage panel; and
   attaching the stub beam to the fitting,
   wherein the fitting is an angle corner fitting, and wherein the fitting is shaped as a three-dimensional triangle with a missing bottom, and wherein a first planar side of the fitting is attached to the wing box assembly.

2. The method of claim 1, wherein attaching the fitting to the wing box assembly includes drilling at least one fastener hole in the fitting and the wing box assembly and fastening through the fitting and into the wing box assembly.

3. The method of claim 2, further comprising deburring the wing box assembly and the fitting after drilling.

4. The method of claim 2, further comprising sealing the wing box assembly after attaching the fitting.

5. The method of claim 4, further comprising leak testing the wing box assembly after sealing.

6. The method of claim 1, wherein attaching the stub beam to the fuselage panel includes drilling at least one fastener hole in the stub beam and the fuselage panel and fastening through the fuselage panel and into the stub beam.

7. The method of claim 1, wherein attaching the stub beam to the fitting includes drilling at least one fastener hole in the stub beam and the fitting and fastening through the fitting and into the stub beam.

8. A method for wing-to-fuselage integration, comprising:
   attaching a first wall of a fitting to a wing box assembly in an early stage of aircraft manufacturing;
   placing a fuselage panel adjacent to the wing box assembly during a later stage of aircraft manufacturing;
   after placing the fuselage panel adjacent to the wing box assembly, attaching a stub beam to the fuselage panel during the later stage of aircraft manufacturing;
   attaching a second wall of the fitting to the stub beam during the later stage of aircraft manufacturing,
   wherein the fitting is an angle corner fitting, and wherein the fitting is shaped as a three-dimensional triangle with a missing bottom,
   and wherein the first wall of the fitting is a first planar side which is attached to the wing box assembly.

9. The method of claim 8, further comprising sealing the wing box assembly after the early stage and before the later stage of aircraft manufacturing.

10. The method of claim 9, further comprising leak testing the wing box assembly after sealing.

11. The method of claim 8, further comprising deburring after the early stage and before the later stage of aircraft manufacturing.

* * * * *